No. 734,677. PATENTED JULY 28, 1903.
M. DEAN.
LOOSE LUG.
APPLICATION FILED JUNE 18, 1902.
NO MODEL.

WITNESSES:
A. Perry
E. L. Payne

INVENTOR
Mark Dean
BY W. P. Preble Jr
his ATTORNEY

No. 734,677. Patented July 28, 1903.

UNITED STATES PATENT OFFICE.

MARK DEAN, OF NEW YORK, N. Y.

LOOSE LUG.

SPECIFICATION forming part of Letters Patent No. 734,677, dated July 28, 1903.

Application filed June 18, 1902. Serial No. 112,122. (No model.)

*To all whom it may concern:*

Be it known that I, MARK DEAN, a citizen of the United States, and a resident of the city, county, and State of New York, have invented a certain new and useful Improvement in Loose Lugs, of which the following is a specification.

The object of my invention is to provide a separate or loose lug adapted to be used for connecting the ends of pipes, pipe-fittings, parts of valves, and all other devices which are usually joined by means of fixed lugs, flanges, clamps, &c.

Among the many advantages of my invention may be mentioned two.

Heretofore it has been extremely difficult and sometimes impossible to connect together pipe ends, T's, and other fittings which are to be set off at an angle owing to the fact that the fixed location of the lugs requires a definite adjustment of the parts in coupling together. On the other hand, the drilling of bolt-holes at various places through the flanges as required by the particular location of the particular fitting is a clumsy, expensive, and not very satisfactory process. By means of my loose lug such angular offset can be attained with great nicety and despatch. The other advantage referred to is the saving of drilling holes in packed joints not merely as to the expense of drilling the bolt-holes, but in saving in the width of the flanges, because my improved loose lug can be applied to a much narrower flange than is required for a bolt-hole and packing-ring. To accomplish these results, all that is required is that the flanges should have the outer edge somewhat higher than the inner portion, so as to prevent the lug from slipping off, and that the under surface of the lug should retreat upwardly and outwardly, so as to set firmly on the pipe-flange, and that the lug should also have a vertical or lateral offset adapted to press against the periphery of the flange and prevent any tendency to be tipped when the pipes or lugs are drawn together.

One form of my invention is shown in the accompanying drawings, in which—

Figure 1:
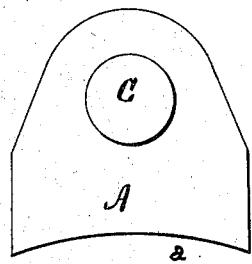
Figure 2:
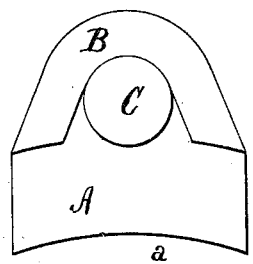
Figure 3:
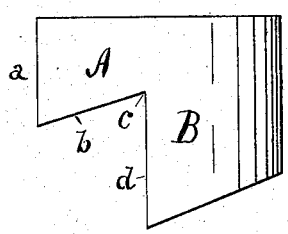
Figure 4:
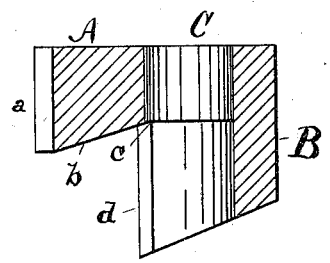
Figure 5:
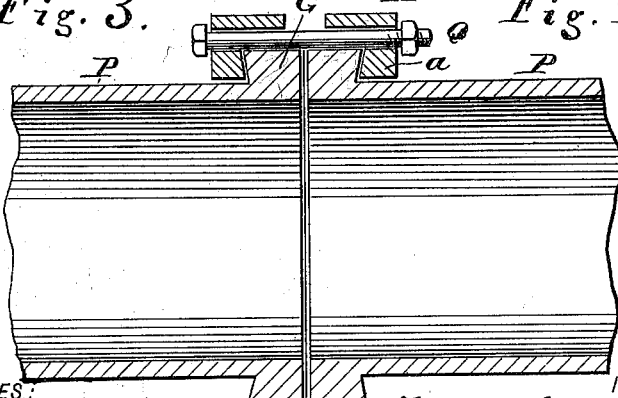

Figure 1 is a top plan. Fig. 2 is a bottom plan. Fig. 3 is a side elevation. Fig. 4 is a longitudinal section. Fig. 5 is a section showing the position and action of the lugs in relation to two pipe ends.

Same letters indicate similar parts in the different drawings.

A is the lug proper or gripping-surface. This, as shown in Figs. 1 and 2 at $a$, is preferably somewhat concave at what may be termed its "inner" edge to correspond with the periphery of the pipe to which it is to be applied. The under side of this portion A, as shown in Figs. 3 and 4, retreats outwardly and upwardly somewhat, as shown at $b$, in a direction either angular, as shown, concave, or otherwise, so that the inner edge when applied to a pipe-flange or other article to be held shall be horizontally lower than the point which is designed to come against the outer edge of said flange. This, as before explained, is to prevent the lug from slipping off, as it would be apt to do from a flat surface, it being, as before stated, understood that the surface to which the lug is to be applied is not flat, but is somewhat depressed to receive this enlargement. The other portion of the lug may be regarded as the shank B and presents no peculiarity except that its inner edge forms the vertical offset $d$ from the other portion of the lug, so that its lateral pressure against the edge of the pipe-flange, in connection with the downward pressure of the inclined or concaved surface $b$ on the top of the flange, will hold the point $c$ snug against the outer edge of the flange.

C is a bolt-hole.

The loose lug above described may be applied in the coupling of pipe ends, pipe-fittings, and other articles in various ways, all of which come within the spirit of my invention.

Two flanged pipes P P can be coupled by the use of two sets of loose lugs, as shown in Fig. 5, one set for each flange, drawn together by the bolt Q. A gasket $p$ may be inserted between the pipes, if desired. A flanged pipe may be coupled with a device having fixed lugs by a single set of loose lugs, the bolts from which engage the fixed lugs. A flange without bolt-holes can be coupled with a flange which has bolt-holes.

In either of the last two ways of coupling the loose lug instead of being formed, as shown, with a bolt-hole may be formed integrally with the bolts, so that the flanged portion A of the loose lug shown becomes virtually an offset head of the bolt, the inner edge of the bolt taking the place of the vertical bearing-surface $d$.

I claim—

A loose lug for coupling purposes, the gripping-surface of which retreats upwardly toward the body of the lug and having a vertical bearing-surface adapted to press against the outer edge of the pipe.

MARK DEAN.

Witnesses:
W. P. PREBLE, Jr.
E. K. PAYNE.